United States Patent
Cummings

[11] Patent Number: 5,886,807
[45] Date of Patent: Mar. 23, 1999

[54] TRAVELING-WAVE REFLECTIVE ELECTRO-OPTIC MODULATOR

[75] Inventor: Uri Cummings, Pasadena, Calif.

[73] Assignee: California Institute of Technology, Pasadena, Calif.

[21] Appl. No.: 999,194

[22] Filed: Dec. 19, 1997

Related U.S. Application Data

[60] Provisional application No. 60/036,243 Jan. 24, 1997.

[51] Int. Cl.[6] ........................................................ G02F 1/35
[52] U.S. Cl. .......................... 359/263; 359/245; 359/251; 359/254; 385/2; 385/3; 385/8; 385/9
[58] Field of Search ............................ 359/245, 251, 359/254, 255, 259, 261, 263; 385/2, 3, 8, 9

[56] References Cited

U.S. PATENT DOCUMENTS

| | | | |
|---|---|---|---|
| 3,694,052 | 9/1972 | Ortel | 359/261 |
| 3,791,718 | 2/1974 | Chow | 359/261 |
| 5,076,655 | 12/1991 | Bridges | 385/3 |
| 5,291,565 | 3/1994 | Schaffner et al. | 385/3 |
| 5,355,422 | 10/1994 | Sullivan et al. | 385/2 |
| 5,548,668 | 8/1996 | Schaffner | 385/2 |
| 5,790,719 | 8/1998 | Mitomi et al. | 385/2 |

FOREIGN PATENT DOCUMENTS

| | | | |
|---|---|---|---|
| 63-141021 | 6/1988 | Japan | 385/2 |
| 01-232323 | 9/1989 | Japan | 385/3 |
| 03-262012 | 9/1991 | Japan | 385/9 |
| 05-249419 | 9/1993 | Japan | 385/2 |
| 09-015545 | 1/1997 | Japan | 385/3 |

*Primary Examiner*—Georgia Epps
*Assistant Examiner*—Margaret Burke
*Attorney, Agent, or Firm*—Fish & Richardson P.C.

[57] ABSTRACT

A traveling-wave electro-optic modulator using reflected signals to achieve a one-time rephasing. For a given crystal length, the interaction length is effectively doubled and a 3-dB gain is automatically achieved compared to a conventional traveling-wave modulator.

29 Claims, 4 Drawing Sheets

TRAVELING-WAVE REFLECTIVE ELECTRO-OPTIC MODULATOR

ORIGIN OF THE INVENTION

The U.S. Government has certain rights to this invention pursuant to Grant No. F30602-C-96-0020 awarded by the United States Air Force.

This application claims the benefit of U.S. Provisional Application No. 60/036,243 filed on Jan. 24, 1997, which is incorporated herein by reference in its entirety.

FIELD OF THE INVENTION

The present invention relates to electro-optic modulators, and more specifically, to a traveling-wave electro-optic modulator for minimizing phase mismatch between the electrical and optical waves within such a modulator.

BACKGROUND OF THE INVENTION

Light modulation can be programmably controlled by electrical signals and has been widely used in data processing devices and communication systems (e.g., cable TV). One implementation of programmable light modulation is electro-optic ("EO") light modulation by using an electro-optic material (e.g., crystals) whose index of refraction changes in response to an externally applied electrical field.

Traveling-wave EO modulators are suitable for light modulation at high frequencies such as in a range above ~$10^8$ Hz. Light modulation using traveling-wave modulators is known to the art. See, for example, "Optical Waves in Crystals: propagation and Control of Laser Radiation", by Yariv and Yeh, John Wiley and Sons (1980). In a traveling-wave EO modulator, the direction of the electrical field of a modulating field is usually perpendicular to the propagation direction of the optical wave. In particular, the modulating wave travels along with the optical wave in substantially the same propagation direction. Much effort in research and development has been made in designing traveling-wave modulators due to their applications in data processing and communication devices and systems. Compact integrated EO modulators are of particular interest in this field for optical fiber networks and other applications.

Figure 1:
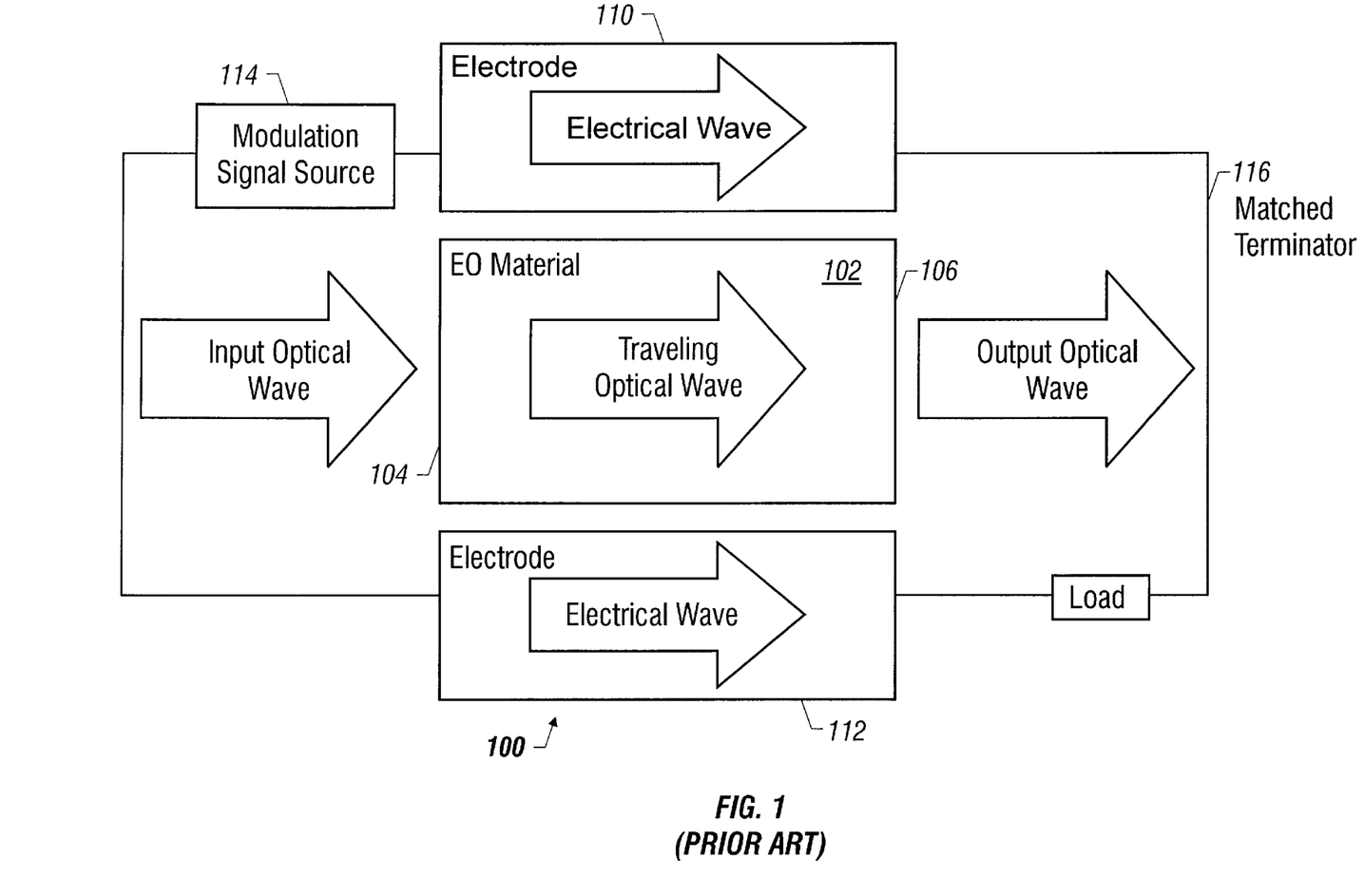
FIG. 1 is a block diagram of a typical conventional traveling-wave electro-optic light modulator.

FIG. 1 shows a conventional traveling-wave light modulator 100. An EO material 102 of length L with optical input and output facets 104 and 106 is placed between two parallel electrodes 110 and 112. In an integrated modulator configuration, the EO material 102 forms a substrate on which an optical waveguide and the electrodes are formed. A modulation signal source 114 is connected to the electrodes 110 and 112 at their ends near the input facet 104 to launch a traveling modulation wave at a modulation frequency $\omega_{mod}$. A signal terminator 116 with a load can be used to terminate the modulating waves at the other ends of the electrodes 110 and 112 close to the output facet 106 of the EO material 102. If the phase velocities of the optical and modulating waves are equal to each other, a portion of an optical wavefront of the optical wave experiences the same instantaneous modulating electrical field. This corresponds to the field which that portion of the optical wavefront encounters at the input facet 104. Such a match in the phase velocities is desirable since the efficiency of modulation is maximum as described hereinafter.

However, material dispersion often adversely affects or prevents this desired phase match condition. Phase velocities of electrical and optical waves are different in most cases. The electrical modulation wave travels at a phase velocity $\upsilon_{mod}$ usually lower than the phase velocity $\upsilon_{opt}$ of the optical wave. In an integrated modulator, this mismatch in phase velocities is primarily caused by the dispersion of the electro-optic material of the substrate. The modulation wave and the optical wave then experience different indices of refraction due to their different frequencies. This can limit the EO modulator to operate at higher modulation frequencies and significantly reduce the modulation depth.

The phase modulation depth $\delta$ of the traveling-wave modulator 100 can be approximately expressed as $$\delta = \beta L \, \frac{\sin(\omega_{mod}\Delta L)}{\omega_{mod}\Delta L}, \qquad (1)$$

where $\beta$ is a factor linearly proportional to the magnitude of the electrical field of the modulation wave and the electro-optic coefficient of the crystal and $\Delta$ is a phase mismatch parameter:

$$\Delta = \frac{1}{2}\left(\frac{1}{\upsilon_{mod}} - \frac{1}{\upsilon_{opt}}\right). \qquad (2)$$

The phase modulation depth $\delta$ increases proportionally with the interaction length L. In addition, the phase modulation depth $\delta$ is dependent on a phase mismatch parameter $\Delta$ and reaches at or near a maximum value when $\Delta=0$, i.e., the phase velocities $\upsilon_{mod}$ and $\upsilon_{opt}$ are equal to each other. Otherwise, the phase modulation is reduced by a factor due to the phase mismatch between the optical wave and the electrical modulation wave. An ideal phase match requires $\upsilon_{mod}=\upsilon_{opt}$. This is usually difficult to achieve in practical devices. In practice, the phase match condition may be considered satisfactory if $$\omega_{mod}\Delta L << \Pi. \qquad (3)$$

Another parameter which sets the performance of the EO modulators is the sensitivity of modulation. It is desirable to achieve a maximal phase modulation depth $\delta$ with a smallest possible drive signal power for a given electro-optic material. This can be accomplished, for example, by increasing the interaction length L of the electro-optic material while maintaining the phase match condition in Equation (3). In addition, choosing an electro-optic material with a large electro-optic coefficient can reduce the drive power required for the modulator.

The phase match condition of the optical wave and the electrical modulation wave can be achieved by implementing a traveling-wave configuration in an EO modulator. In general, this can be done by either reducing the phase velocity of the optical wave or speeding up the electrical wave. One way to accomplish the former is disposing bends with a higher refractive index in the waveguide. However, loss by light scattering in the bends is often unacceptably high, thus making this technique impractical in many applications.

There have been two different approaches in increasing the effective phase velocity of the electrical wave to match that of the optical wave.

One approach utilizes a buffering layer of a low index insulator, such as a $SiO_2$ layer, between the electro-optic crystal and an electrode wherein the electrical wave propagates. See, Gopalakrisna et al., "40 GHZ Low Half Wave Voltage Ti:LiNbO3 Intensity Modulators", Electronic Letters, Vol. 28, pp. 2056–2068 (1995). This buffering layer lifts the fields out of the crystal and effectively reduces the index of refraction experienced by the electrical wave. As a result, the phase velocity of the electrical wave is increased. This velocity matching technique can be effective. However, field penetration to the crystal is reduced and consequently the modulation sensitivity is compromised. Another limitation of this approach is that a large and uniform buffering layer is usually difficult to grow and can be expensive.

A second alternative approach is to increase the speed of the electrical wave on the average rather than uniformly in the electrical path. Therefore, the phase velocity of an electrical wave may not have been equal to the optical phase velocity. However, on the average, the phase mismatch between the electrical wave and the optical wave is minimized. One implementation of this approach uses a plurality of small and separate electrodes to form an electrode array along each side of the optical path (e.g., the optical waveguide in an integrated system) instead of having a single-piece electrode on each side of the optical path in the electro-optic material. The modulator splits the electrical modulation wave accordingly into a plurality of portions with each being fed to one of the small electrodes. Multiple electrical paths from the modulation signal source to each small electrode are formed in a way such that the initial phase of each portion of the input electrical modulation wave at a corresponding small electrode matches the phase of the optical wave. A small phase mismatch develops as each portion of the electrical wave propagates along each small electrode. However, the average phase mismatch for the entire electrode array is substantially eliminated. This is because, at least in part, the length of each small electrode is small compared to the interaction length.

U. S. Pat. No. 5,076,655 to Bridges describes such a system which uses an antenna array to implement the electrode array. An electrical modulation wave is used to illuminate the antenna array at a selected angle with respect to the array so that a modulation electrical wave arriving at each antenna has a different phase delay and matches the phase of the optical wave at that antenna. U.S. Pat. No. 5,291,565 to Schaffner et al. discloses another system to implement the above technique.

This second approach for speeding up the electrical wave may also be limited in several respects. For example, splitting the electrical modulation wave into multiple waves (e.g., N waves) reduces the voltage on each electrode in the array by a factor of $N^{1/2}$, thereby decreasing the modulation sensitivity. In addition, the structure of the RF electrode array is complex and accordingly the construction of the entire modulator becomes complicated.

SUMMARY OF THE INVENTION

The present disclosure describes a reflection-mode electro-optic modulator using a traveling electrical modulation wave. According to one embodiment of the invention, a reflective electro-optic modulator includes an electro-optic material having an optical path therein to transmit an optical signal, an optical reflector disposed relative to the electro-optic material to reflect the optical signal to retrace the optical path, and at least one electrode elongated in a direction parallel to the optical path and having a first end for receiving said electrical modulation signal and a second end with a signal reflector for reflecting said electrical modulation signal to retrace the electrode. The electrode has an electrode length shorter than the optical length by an appropriate amount to effect a phase matching between the reflected electrical modulation signal and the reflected optical signal.

The location at which the electrical and optical signals have the same phase delay may be preferably configured to be near or at the second end of the electrode to minimize the length of the electro-optic material. One advantage of this configuration is that the interaction length is nearly doubled for a given electro-optic crystal compared to the interaction length of a conventional traveling-wave EO modulator. This increased interaction length can significantly improve the modulation sensitivity.

Another advantage includes maintaining the simplicity of the traveling-wave geometry in achieving rephasing of the optical and electrical signals.

Yet another advantage is rephasing without splitting the input electrical modulation power. Comparing with conventional two-segment electrode modulators, this automatically results in a gain of 3 dB.

The reflective rephasing scheme can be implemented in a variety of EO modulators, including but not limited to, Mach-Zehnder modulators and directional couplers. Using reflective rephasing in linearized modulators, e.g., a dual series Mach-Zehnder modulator, may significantly improve the dynamic range.

These and other aspects and advantages of the invention will become more apparent in light of the following detailed description, including the accompanying drawings and appended claims.

DETAILED DESCRIPTION OF THE INVENTION

1. Traveling-Wave Reflective Phase Modulator

Figure 2A:
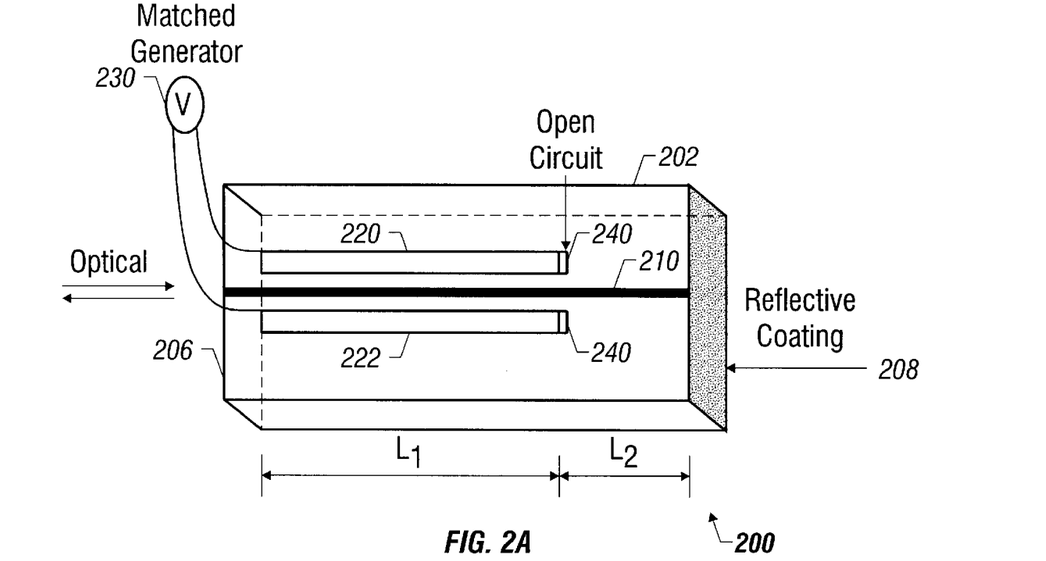
FIG. 2A is diagram showing one embodiment of a phase modulator in reflective traveling wave configuration.

FIG. 2A shows one embodiment 200 of the traveling-wave reflective phase modulator in accordance with the invention. This is an integrated modulator formed on an electro-optic material 202 (e.g., LiNbO$_3$ and GaAs crystals) having two opposing facets 206 and 208 that are preferably parallel to each other. An optical waveguide 210 is formed in the EO material 202 to provide an electrically-controlled optical conduit, preferably along a direction substantially perpendicular to facets 206 and 208. The facet 206 is transparent and used for transmitting an optical wave. Facet 208 is reflective so that an input optical wave to the waveguide 210 is reflected back toward the input, thereby traversing the waveguide 210 twice. This can be achieved by applying a reflective coating on the inner surface of the facet 208. Alternatively, an optically reflective surface such as a mirror may be used to reflect the optical wave.

Two electrodes 220 and 222 are formed adjacent to the optical waveguide 210. The electrodes 220 and 222 have respective first ends 221, 223 on the side of the facet 206, and second ends 225, 227 on the other end. Preferably, the electrodes 220 and 222 are substantially parallel to each other and are shorter than the length of the EO material 202 between facets 206 and 208. The electrodes 220 and 222 can be used to provide a modulation electrical field at least in a portion of the optical waveguide 210 extending from the first end near the facet 206 to the second end near the facet 208. Flat stripline conductors, for example, may be formed on the surface of the electro-optic material 202 as the electrodes 220 and 222.

A signal generator 230 is electrically connected to electrodes 220 and 222 at the first ends 221, 223 near the facet 206 and initiates a traveling modulation wave. Each electrode has a signal reflector 240 at the second end (225 or 227) close to the facet 208 in order to reflect the modulation wave and form a reflected modulation wave with the same magnitude and phase as the original incident modulation wave but propagating in the opposite direction. An open circuit transmission line termination, for example, may be used as the signal reflector 240.

In this embodiment, an optical wave launched in the device travels along an optical path from the facet 206, to the reflective facet 208, and back to the facet 206. This optical path is longer than an electrical path of the traveling modulation wave which is from the ends 221, 223, to the other ends 225, 227, and back to the ends 221, 223 of the electrodes 220 and 222. Hence, the reflected optical wave is delayed in phase relative to the reflected electrical wave. This phase delay can be used to phase match reflected optical and electrical waves at any location between the facet 206 and the terminators 240 covered by the electrodes. The optical phase delay may be adjusted by selecting the length of the EO material 202 so that a reflected optical wave is in phase with a reflected electrical wave at a selected location.

One phase-matching location for the reflections is at the second ends 225, 227 of the electrodes 220 and 222 close to the reflecting facet 208. Assume the length of the electrodes is $L_1$ and the EO material 202 is longer than the electrodes by an amount $L_2$. The total length of the crystal is thus $(L_1+L_2)$. Phase matching at the second ends 225, 227 of the electrodes 220 and 222 of optical and electrical waves that are simultaneously launched at the facet 206 requires:

$$\frac{L_1}{c/n_{mic}} = \frac{2L_2 + L_1}{c/n_{opt}}, \tag{4}$$

where c is the speed of light in vacuum, $n_{mic}$ is the refractive index at a frequency of the electrical wave, $n_{opt}$ is the refractive index at a frequency of the optical wave, respectively. The desired extra length $L_2$ of the EO material 202 can thus be determined:

$$L_2 = \frac{1}{2}\left(\frac{n_{mic}}{n_{opt}} - 1\right)L_1. \tag{5}$$

For LiNbO$_3$, $n_{opt}$~2.2, $n_{mic}$~4.0, thus, $L_2$~0.41 $L_1$. Therefore, a LiNbO$_3$ crystal should be about 41% longer than the rf electrodes. For simplicity of discussion, it is assumed that the first ends 221, 223 of the electrodes 220 and 222 are so close to the facet 206 and the phase delay associated with the spacing between the facet 206 and the first ends 221, 223 can be neglected.

Equation (5) indicates a minimum extra length of an EO crystal for phase matching in such a reflective phase modulator 200. Phase matching at other locations requires an appropriate amount of increase over the minimum crystal length. For example, if the phase matching location is x away from the reflective terminator 240 in the electrodes, the extra length $L_2$ is then given by:

$$L_2 = \frac{1}{2}\left(\frac{n_{mic}}{n_{opt}} - 1\right)L_1 + \frac{1}{2}\frac{n_{mic}}{n_{opt}}x. \tag{6}$$

The extra real estate, $L_2$, of the EO material 202 may be utilized for placing one or more bias electrodes that are often necessary for proper operation of a modulator, provided that there is no capacitive coupling onto the bias electrodes.

One advantage of the system 200 is the significantly improved utilization of the EO material which results from making the effective interaction length double that of the electrode length. This improves the compactness of the device and reduces the manufacturing cost since EO crystals are usually expensive.

One may readily appreciate other advantages of the embodiment 200 of the invention. For example, the embodiment 200 has a simple construction. The simple traveling-wave geometry is maintained without additional complexity in construction geometry and electrical wiring. Such a configuration can facilitate the device integration, improve reliability and further reduces the cost.

For another example, the embodiment 200 accomplishes the rephasing by effectively using a single-piece electrode on each side of the optical waveguide 210 in the EO material 202 to function as two identical electrodes connected in series. Thus, the embodiment 200 can be viewed as a special case of multiple segment electrodes. However, unlike convention systems with multiple segment electrodes, the embodiment 200 does not partition the rf power from the signal generator 230 into multiple parts. Therefore, a 3-dB gain is automatically achieved in the embodiment 200 over a conventional system having two electrode segments.

The embodiment 200 may be combined with other velocity matching techniques to achieve light modulation at an increased frequency. Velocity matching techniques reduce the inherent velocity dispersion in the crystal. For example, a large SiO$_2$ buffering layer may be disposed between the electrodes and the crystal to reduce the microwave index of refraction and thus the velocity dispersion.

Figure 2B:
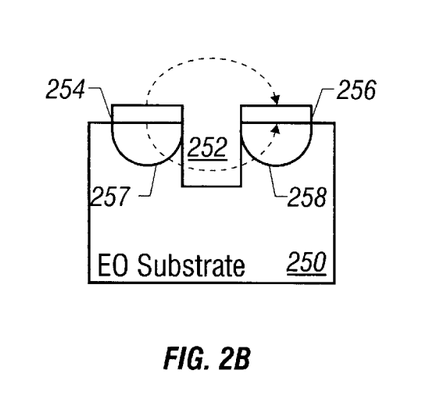
FIGS. 2B and 2C are cross sectional diagrams showing two EO modulators using an ion-milled trench to increase the effective phase velocity of a traveling electrical wave.
Figure 2C:
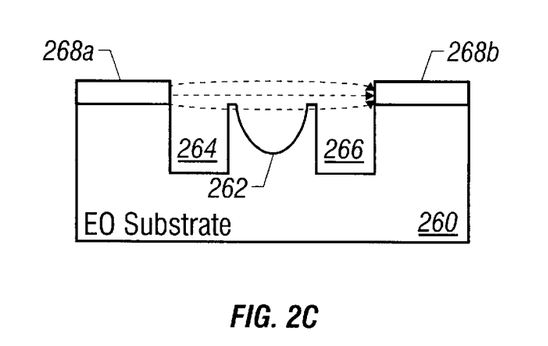

Another technique is the ion milling of trenches in the LiNbO$_3$. The milling removes a portion of the high index EO material outside the optical waveguide or optical path but adjacent to the electrodes. This portion of EO material would otherwise be exposed to the electric field and further reduce the velocity of the electrical wave. FIG. 2B shows a directional coupler formed in an EO substrate 250 with an ion-milled structure. A portion of the EO material is removed by ion milling to form a trench 252 between optical waveguides 257 and 258. Thus, an electrical field between the waveguides produced by two electrodes 254 and 258 will interact with air rather than the EO material with higher refractive index. This reduces the effective refractive index of the traveling electric wave and thereby speeds up the phase velocity. Due to the proximity of the two waveguides 257 and 258, the electrical field produced by the electrodes 254 and 256 (indicated by the dashed arrow lines) is primarily in the vertical direction within the two waveguides 257 and 258. The EO crystal may be cut to be sensitive to the vertical field component (e.g., z-cut). FIG. 2C shows another example where a waveguide 262 formed in an EO substrate 260. Two trenches 264 and 266 are formed on both sides of the waveguide 262 to reduce the effective refractive index by the traveling electrical wave produced by the two electrodes 268*a* and 268*b*. Since the electrical field within the waveguide 262 is primarily horizontal, the EO crystal may also be cut accordingly to increase the electro-optic effect (e.g., x-cut). This configuration may be used as a phase modulator or one modulation branch in a Mach-Zehnder modulator.

Partial velocity matching may be used on a traveling wave reflective modulator in accordance with the present invention to increase operating bandwidth. A difference in the refractive indices experienced by the electrical and optical waves can be reduced by various techniques but it is usually difficult to null this difference completely. For example, a modulator design might meet the specification for sensitivity but might also need a 3-dB point that occurs at twice the frequency. Here, one could attempt to reduce the refractive index difference by a factor of two through a velocity matching technique.

It should be understood that the embodiment 200 of FIG. 2 is only one example, and more specifically an integrated example, of the traveling-wave reflective phase modulator. Many other configurations are possible. For example, a lumped reflective modulator may be constructed by using either a mirror or a reflective coating to reflect the optical wave back to the EO crystal.

2. Traveling-Wave Reflective Mach-Zehnder Modulators

Figure 3A:
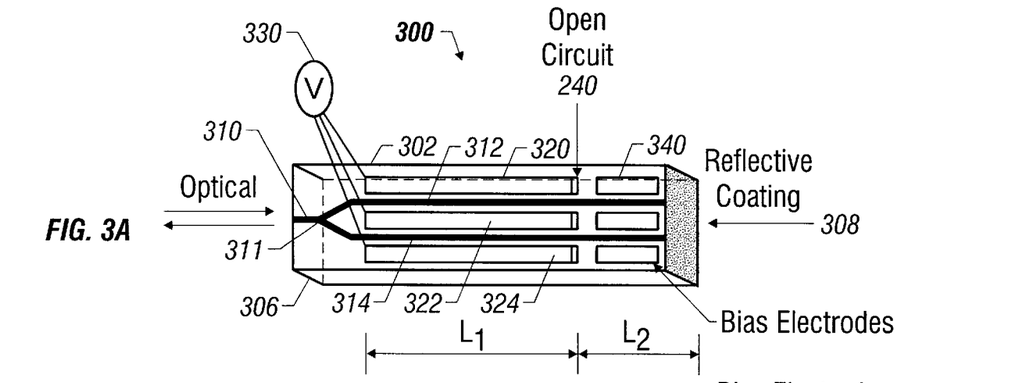
FIG. 3A is a diagram showing an embodiment of a Mach-Zehnder modulator in reflective traveling wave configuration.

FIG. 3A shows an integrated Mach-Zehnder modulator 300 using the reflection configuration in accordance with the present invention. The modulator 300 is formed on a piece of electro-optic material 302 (e.g., $LiNbO_3$ crystal) having two opposing facets, the input facet 306 and reflective facet 308 that are preferably parallel to each other. The reflective facet 308 may be formed by having reflective coating thereon.

Three optical waveguides 310, 312, and 314 are formed in the EO material 302. The optical waveguide 310 may be substantially perpendicular to the input facet 306 and serve as the optical input and output of the modulator 300. The waveguides 312 and 314 are substantially parallel to each other and have substantially the same optical path length. A waveguide coupler 311 couples the waveguide 310 to the first ends of waveguides 312 and 314 so that an input optical wave from the waveguide 310 can be split into two substantially identical portions to waveguides 312 and 314. Both waveguides 312 and 314 are preferably perpendicular to the reflective facet 308 and terminated at the facet 308 so that an optical wave traveling towards the facet 308 in the waveguide will be reflected to propagate away from the facet 308.

Three substantially identical and elongated electrodes 320, 322, and 324 are disposed in the EO substrate 302 parallel to the optical waveguides 312 and 314. A modulation signal generator 330 is electrically connected to the first ends of the electrodes close to the coupler 311 and initiates a traveling modulation electrical wave into the electrodes. Each electrode has a signal reflector 240 (e.g., an open circuit transmission line terminator) at a second end close to the reflective facet 208.

The EO substrate 302 is extended by a predetermined length $L_2$ beyond the signal reflector 240 of the electrode in order to match the phases of reflected electrical and optical waves at a selected location as described previously. The extra substrate area may be used to place bias electrodes 340.

The Mach-Zehnder modulator 300 is in effect a "folded" conventional Mach-Zehnder modulator. An input optical wave is fed through the optical waveguide 310 and split into two different signals in waveguides 312 and 314. The light modulation is implemented by launching a traveling electrical signal into the electrodes 320, 322, and 324. The split optical signals are reflected back from the reflective facet 308 and recombined at the coupler 311. The resultant optical signal is then sent out by the waveguide 310.

Figure 3B:
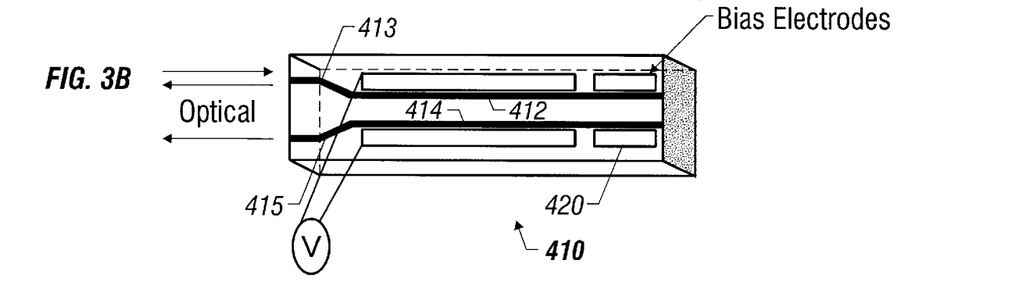
FIG. 3B is a diagram showing an embodiment of a linearized dual series Mach-Zehnder modulator in reflective traveling wave configuration.

The reflective scheme in accordance with the invention may be used to construct linearized electrooptic modulators. Linearization in EO modulators reduces harmonic signals and intermodulation products in order to improve the modulation dynamic range. FIG. 3B shows an embodiment of a linearized dual series Mach-Zehnder modulator (DSMZ) 350. The DSMZ 350 has a complete conventional Mach-Zehnder optical path having a first optical coupler 311, two waveguides 312 and 314, and a second optical coupler 313 which is terminated by a reflective facet of the OE substrate. The reflective scheme allows the single Mach-Zehnder optical path to function effectively as two Mach-Zehnder modulators: a first modulator using the first coupler 311 as its input and the second coupler 313 as its output, a second modulator using the second coupler 313 as its input and the first coupler 311 as its output. The two modulators are connected in series: the input of the second modulator is the reflection of the output of the first modulator. Note that both modulators share the same set of bias electrodes 360 with the same electrical voltage. The linearization of a DSMZ with identical bias voltages on the two modulators has been demonstrated. See, Betts and O'Donnell, "Microwave analog optical links using suboctave linearized modulators", in IEEE Photonics Technology Letters, Vol. 8(9), pp. 1273–1275 (1996), which is incorporated herein by reference.

The rephased reflected optical wave is especially useful in linearized electrooptic modulators. This is in part because the linearization schemes use sensitive cancellation techniques and a small amount of velocity mismatch may cause severe degradation in performance. For example, a Linearization scheme may yield an extra 20 dB of dynamic range at low frequencies, but the improvement can be quickly lost as the frequency increases due to phase mismatch. The effects are much more pronounced than the reduction in gain, which is normally considered the limiting factor for operation at high frequencies (e.g., larger than 1 GHz).

Figure 3C:
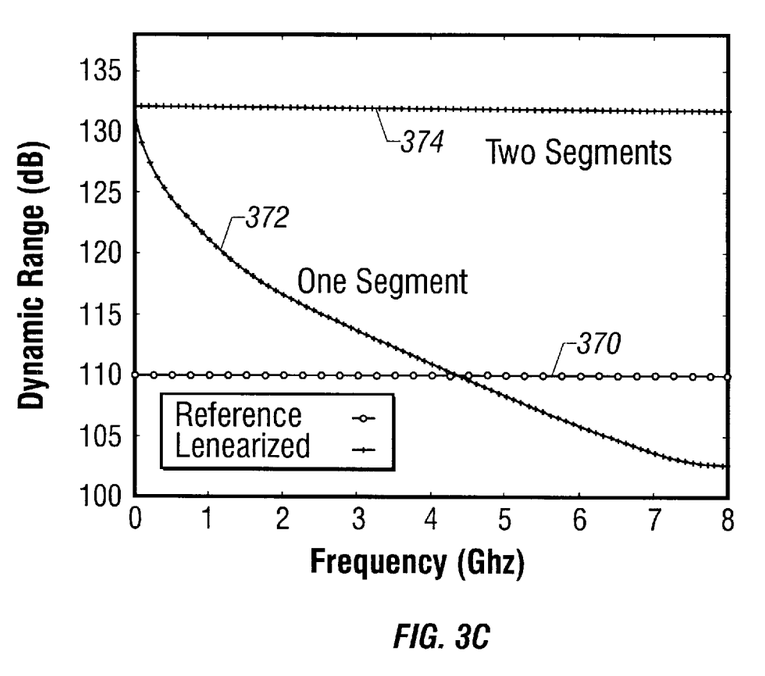
FIG. 3C is a chart showing frequency dependence of the dynamic range of a conventional linearized Mach-Zehnder modulator and a reflective linearized Mach-Zehnder modulator.

The advantage of the invention in this aspect may be illustrated by FIG. 3C, which shows the calculated dynamic range for a $LiNbO_3$ DSMZ modulator with a set of typical design parameters. The line 370 at 110 dB is a reference line of a non-linearized modulator. It does not degrade with frequency because while the gain decreases with frequency, the distortion terms attenuate at the same rate. Curve 372 represents the dynamic range as a function of frequency for a linearized modulator with a single-segmented traveling wave electrode. An initial improvement in the dynamic range of 24 dB at low frequencies falls off dramatically with increasing frequency. Similar analysis on other conventional linearized modulators shows a similar rapid roll-off in dynamic range when there is no rephasing of the electrical and optical waves.

The reflective linearized DSMZ modulator 350 of FIG. 3B, however, shows a much improved dynamic range at about 133 dB that remains substantially unchanged with the frequency (curve 374). Since the reduction in dynamic range is a function of the phase error at the second Mach-Zehnder modulator, the rephasing between the electrical and optical waves at the input of the second Mach-Zehnder minimizes the roll-off of the enhanced dynamic range. The calculation shows that the gain of the reflective linearized modulator 350 is limited. The 3-dB gain point in the calculation is about 8 GHZ. The fact that one rephasing is sufficient to make the reflective linearized modulator robust to velocity mismatch demonstrates its commercial potential for linearized electrooptic modulators.

3. Traveling-Wave Reflective Directional Coupler Modulators

Directional couplers are well known in the art. The inventor of the present invention recognized that a reflective directional coupler can be constructed using the reflective scheme of the invention to achieve a more compact configuration and improved coupling efficiency over the conventional couplers.

Figure 4A:
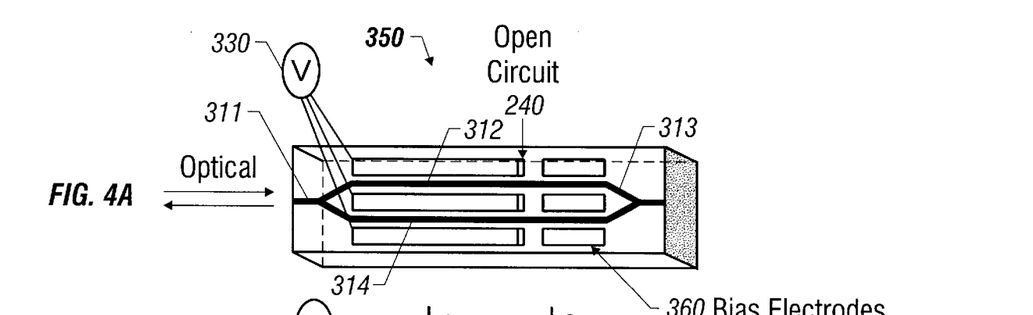
FIG. 4A is diagram of a directional coupler in reflective traveling wave configuration.

FIG. 4A shows one embodiment 410 of such a directional coupler. An EO substrate has two waveguides 412 and 414 formed at a close proximity in a substantially parallel fashion with respect to each other to facilitate energy coupling therebetween. The waveguides 412 and 414 have input/output waveguide terminals 413 and 415 that are apart from each other to minimize the energy coupling. The waveguide 412 may be used as the input of the coupler 410. The performance of the directional coupler 410 may be characterized by a transfer function, H:

$$H \propto \operatorname{sinc}\left[(kL)\sqrt{1+\left(\sqrt{3}\;\frac{V}{V_s}\right)}\;\right], \quad (7)$$

where k is the coupling coefficient, L is the length of the modulator, V is the voltage amplitude and $V_s$ is normalization constant in volts. The characteristic electrical length, (kL), of the waveguides can be chosen by design to obtain an electrical path length equivalent to a phase of either $(kL)=\pi/2$ or $\pi$. If $(kL)=\pi/2$, all of the input optical power is coupled to the second guide 414 and comes out at the terminal 415. If $(kL)=\pi$, then all of the input power will come out of the input guide 412 at the terminal 413. The choice of the characteristic electrical length is determined by a specific requirement of a device or system.

For example, in a remote application, it may be desirable to have only one fiber and to locate a laser away from the modulator. Therefore, the characteristic electrical length of the electrical path should be set to Π. However, other applications may require $\pi/2$ and eliminate the need for an optical circulator. Note also that the bias electrodes 420 conveniently fit in the space allocated for delaying the optical wave.

Figure 4B:
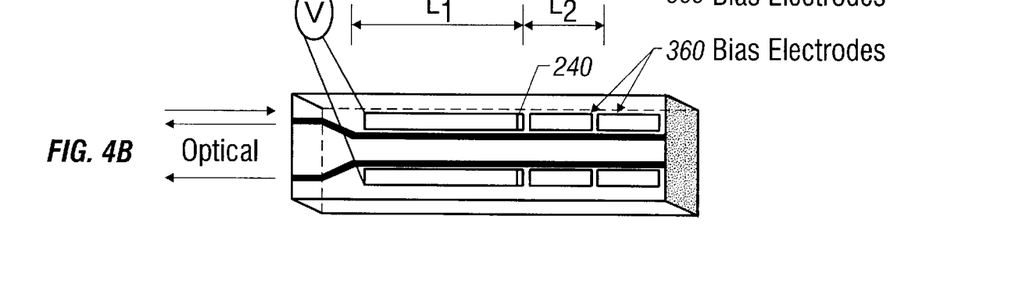
FIG. 4B is diagram of a linearized directional coupler in reflective traveling wave configuration.

FIG. 4B shows a linearized reflective directional coupler using the reflective scheme of the invention. The linearization mechanism is used here to achieve an improved operation bandwidth over a non-linearized directional coupler of FIG. 4A. It is known that each channel in a linearized directional coupler needs two bias electrodes each with an electrical length of $\pi/4$ and a rf electrode of a length of $\pi/2$ for applying a modulation electrical signal. With standard manufacturing dimensions in LiNbO$_3$, this requirement leads to a long modulator using a conventional linearized directional coupler configuration. In practice, fabrication of such modulators with long EO crystals may be difficult and expensive. The reflective modulator of FIG. 4B, however, can have the same electrical lengths while being only half as long.

Although the present invention has been described in detail with reference to a few embodiments, one ordinarily skilled in the art to which this invention pertains will appreciate that various modifications and enhancements may be made without departing from the scope and spirit of the invention. For example, different geometries other than those disclosed may be used. The waveguide(s) and the electrodes for carrying the modulation signals may be bent or curved. The electrodes may be formed by multiple separated conductors disposed along the waveguide(s) extending from the first end to the second end in which the effective length of the electrode(s) may be electrically changed to adjust the phase matching.

In addition, a variety of electro-optical materials may be used other than those mentioned, including but not limited to, Gallium Phosphide (GaP), Lithium Talbate (LiTaO$_3$), KDP, BaTiO$_3$, and Potassium Niobate (KNbO$_3$). Some commonly used EO materials that can be used in the present invention are listed in Table 9.2 in Chapter 9 of Optical Electronics, 4th edition, by A. Yariv, Saunders College Publishing (1991), which is incorporated herein by reference.

These and other variations are intended to be encompassed by the invention which is defined in the following claims.

What is claimed is:

1. An electro-optic modulator, comprising:
   an electro-optic material having an index of refraction responsive to an electrical modulation signal and defining an optical path of a selected optical length to transmit an optical signal that traces said optical path;
   an optical reflector, disposed relative to said electro-optic material to reflect said optical signal to retrace said optical path;
   at least one electrode disposed relative to said electro-optic material and configured to provide an electrical conduit for said electrical modulation signal along said optical path, said electrode having a first portion to receive said electrical modulation signal; and
   a signal reflector disposed at a second portion of said electrode spaced from said first portion and configured to reflect said electrical modulation signal back to said first portion, wherein said electro-optic material and said electrode are configured to effect a phase matching between said electrical modulation signal reflected by said signal reflector and said optical signal reflected by said optical reflector.

2. An electro-optic modulator as in claim 1, wherein said optical reflector is a reflective coating formed on a facet of said electro-optic material.

3. An electro-optic modulator as in claim 1, wherein said optical reflector is a mirror located relative to said electro-optic material.

4. An electro-optic modulator as in claim 1, wherein said signal reflector is an open circuit transmission terminator.

5. An electro-optic modulator as in claim 1, wherein said electrode is elongated in a direction substantially parallel to said optical path and has an electrode length shorter than said optical length by a specified length amount.

6. An electro-optic modulator as in claim 5, wherein said length amount is so chosen that said electrical modulation signal reflected by said signal reflector and said optical signal reflected by said optical reflector have the same phase at said second portion of said electrode.

7. An electro-optic modulator as in claim 1, wherein said optical path is defined by an optical waveguide formed within said electro-optic material.

8. An electro-optic modulator as in claim 1, wherein said electrode is formed of a single piece of conductive material on said electro-optic material.

9. An electro-optic modulator as in claim 1, wherein said first and second portions in said electrode are respectively two ends of said electrode.

10. An electro-optic modulator as in claim 1, wherein said electrode includes a plurality of separate conductive elements.

11. An electro-optic modulator, comprising:

an electro-optic crystal of a prespecified crystal length having a first transmissive facet receiving and exporting an optical signal, and a second reflective facet substantially parallel to said first transmissive facet, said electro-optic crystal configured to define an optical waveguide to form an optical conduit between said first and second facets; and a pair of substantially parallel electrode stripes formed on said crystal and located on each side of said optical waveguide, each of said electrode stripes having a first portion close to said first transmissive facet which receives an electrical modulation signal and a second portion close to said second reflective facet which has an open circuit transmission terminator to reflect said electrical modulation signal towards said first portion, a distance between said first and second portions defining an electrode length, wherein said crystal length is longer than said electrode length by an amount such that said optical signal reflected from said second facet undergoes the same phase delay at a phase-match location between and including said first and second portions as said electrical modulation signal that is reflected from said transmission terminator.

12. An electro-optic modulator as in claim 11, wherein said phase-match location is at said second portion.

13. An electro-optic modulator as in claim 11, wherein said first and second portions are respectively located at two ends of said electrode stripes.

14. An electro-optic modulator as in claim 11, wherein said crystal is selected from a group consisting of $LiNbO_3$, GaAs, GaP, $LiTaO_3$, KDP, $BaTiO_3$, and $KNbO_3$.

15. An electro-optic modulator as in claim 11, further comprising a plurality of bias electrodes located on said crystal between said second reflective facet and said second portion of said electrode stripes and configured to provide bias electrical signals to said waveguide.

16. An electro-optic modulator as in claim 11, wherein said crystal is configured to have a second optical waveguide disposed with respect to said optical waveguide in parallel between said pair of electrode stripes to form a second optical conduit between said first and second facets in said crystal, wherein said optical waveguides are in a close proximity to each other to effect an energy coupling therebetween to form a directional coupler modulator.

17. An electro-optic modulator as in claim 16, further comprising bias electrodes located on said crystal near said optical waveguides between said second portion of said electrode stripes and said second facet of said crystal, said bias electrodes operating to effect a linearization mechanism in said directional coupler modulator.

18. An electro-optic modulator that effects a Mach-Zehnder modulator, comprising:

an electro-optic crystal of a prespecified crystal length having a first transmissive facet receiving and exporting an optical signal, and a second reflective facet substantially parallel to said first transmissive facet;

first and second optical waveguides formed in said crystal and configured to have a first end and a second end, said second end terminated at said second reflective facet;

an optical coupler formed in said crystal and configured to combine said first ends of first and second waveguides to form a common waveguide terminated at said first transmissive facet, said common waveguide receiving and splitting said input optical signal into first and second optical signals in said first and second waveguides, respectively;

three substantially parallel electrode stripes formed on said crystal and disposed relative to said first and second waveguides so that one of said electrode stripes is between said first and second waveguides and the other two electrode stripes are respectively located on the other side of said first and second electrode stripes, each of said electrode stripes having a first portion close to said first transmissive facet which receives an electrical modulation signal and a second portion close to said second reflective facet; and an open circuit transmission terminator connected to said second portion of each of said electrode stripes to reflect said electrical modulation signal towards said first portion, wherein said crystal and said electrode stripes are configured to cause said first and second optical signals reflected from said second reflective facet to have a phase delay at a phase-match location between and including said first and second portions equal to said electrical modulation signal that is reflected from said transmission terminator.

19. An electro-optic modulator as in claim 18, wherein said phase-match location is at said second portion.

20. An electro-optic modulator as in claim 18, wherein said first and second portions are respectively located at two ends of said electrode stripes.

21. An electro-optic modulator as in claim 18, wherein said crystal is selected from a group consisting of $LiNbO_3$, GaAs, GaP, $LiTaO_3$, KDP, $BaTiO_3$, and $KNbO_3$.

22. An electro-optic modulator as in claim 18, further comprising a plurality of bias electrodes located on said crystal between said second reflective facet and said second portion of said electrode stripes and configured to provide bias electrical signals to said first and second waveguides.

23. An electro-optic modulator that effects two Mach-Zehnder modulators optically connected in series, comprising:

an electro-optic crystal of a prespecified crystal length having a first transmissive facet receiving and exporting an optical signal, and a second reflective facet substantially parallel to said first transmissive facet;

first and second optical waveguides formed in said crystal and configured to have a first end and a second end;

a first optical coupler formed in said crystal and configured to combine said first ends of first and second waveguides to form a first common waveguide terminated at said first transmissive facet, said first common waveguide receiving and splitting said optical signal in said first and second waveguides, respectively;

a second optical coupler formed in said crystal and configured to combine said second ends of first and second waveguides to form a second common waveguide terminated at said second reflective facet, said second common waveguide receiving and splitting a reflected optical signal from said second reflective facet in said first and second waveguides, respectively;

three substantially parallel electrode stripes formed on said crystal and disposed relative to said first and second waveguides so that one of said electrode stripes is between said first and second waveguides and the other two electrode stripes are respectively located on the other side of said first and second electrode stripes, each of said electrode stripes having a first portion close to said first transmissive facet which receives an electrical modulation signal and a second portion close to said second reflective facet; and an open circuit transmission terminator connected to said second portion of each of said electrode stripes to reflect said electrical modulation signal towards said first portion, wherein said crystal and said electrode stripes are configured to cause said reflected optical signals from said second reflective facet in said first and second waveguides to have a phase delay at a phase-match location between and including said first and second portions equal to said electrical modulation signal that is reflected from said transmission terminator.

24. An electro-optic modulator as in claim 23, wherein said phase-match location is at said second portion.

25. An electro-optic modulator as in claim 23, wherein said first and second portions are respectively located at two ends of said electrode stripes.

26. An electro-optic modulator as in claim 23, wherein said crystal is selected from a group consisting of $LiNbO_3$, GaAs, GaP, $LiTaO_3$, KDP, $BaTiO_3$, and $KNbO_3$.

27. An electro-optic modulator as in claim 23, further comprising a plurality of bias electrodes located on said crystal between said second reflective facet and said second portion of said electrode stripes and configured to provide bias electrical signals to said first and second waveguides.

28. A method for performing optical modulation, comprising:

directing an optical wave in an optical waveguide formed within an electro-optic material to travel in a first direction;

injecting a traveling electrical modulation wave into a pair of electrodes located adjacent to said optical waveguide to travel along said first direction at a first location, said electrical modulation wave operable to change an index of refraction of said optical waveguide to effect an optical modulation on said optical wave;

reflecting said traveling electrical modulation wave back to said first location at a second location along said optical waveguide by using an electrical signal reflector;

reflecting said optical wave to retrace said optical waveguide along a second direction opposing said first direction at a third location along said optical waveguide; and phase matching said reflected electrical modulation wave and said reflected optical wave at a location between and including said first and second locations to increase an efficiency of said modulation by adjusting a distance between said second and third locations along said optical waveguide according to said electrical length.

29. The method as in claim 28, wherein said reflected electrical modulation wave and said reflected optical wave are phase matched at said second location to reduce an amount of said electro-optic material.

* * * * *